United States Patent
Bartel

(10) Patent No.: US 9,877,473 B2
(45) Date of Patent: Jan. 30, 2018

(54) TURKEY FAN DECOY

(71) Applicant: Darrell Duane Bartel, Waupaca, WI (US)

(72) Inventor: Darrell Duane Bartel, Waupaca, WI (US)

( * ) Notice: Subject to any disclaimer, the term of this patent is extended or adjusted under 35 U.S.C. 154(b) by 105 days.

(21) Appl. No.: 14/757,163

(22) Filed: Nov. 27, 2015

(65) Prior Publication Data

US 2016/0198701 A1    Jul. 14, 2016

Related U.S. Application Data

(60) Provisional application No. 62/125,165, filed on Jan. 14, 2015.

(51) Int. Cl.
  *A01M 31/06*    (2006.01)
  *F16B 2/06*     (2006.01)

(52) U.S. Cl.
  CPC ............. *A01M 31/06* (2013.01); *F16B 2/065* (2013.01)

(58) Field of Classification Search
  CPC .................................................. A01M 31/06
  USPC ......................................................... 43/2, 3
  See application file for complete search history.

(56) References Cited

U.S. PATENT DOCUMENTS

| | | | |
|---|---|---|---|
| 4,590,699 A * | 5/1986 | Nicks | A01M 31/06 43/2 |
| 6,070,356 A | 6/2000 | Brint et al. | |
| 6,092,322 A | 7/2000 | Samaras | |
| 6,487,810 B1 * | 12/2002 | Loughman | A01M 31/06 43/2 |
| 6,775,943 B2 * | 8/2004 | Loughman | A01M 31/06 43/2 |
| 7,231,737 B2 | 6/2007 | Bradford | |
| 7,784,213 B1 * | 8/2010 | Primos | A01M 31/06 43/2 |
| 8,230,638 B1 * | 7/2012 | Dunaway | A01M 31/06 43/2 |
| 8,769,860 B2 * | 7/2014 | Bain | A01M 31/06 43/2 |
| 8,793,922 B2 * | 8/2014 | Roe | A01M 31/06 43/2 |
| 8,925,240 B2 * | 1/2015 | Beal | A01M 31/06 43/2 |
| 2008/0216381 A1 | 9/2008 | Wyant | |
| 2014/0130396 A1 * | 5/2014 | Yaron | A01M 31/06 43/2 |

* cited by examiner

*Primary Examiner* — David Parsley

(74) *Attorney, Agent, or Firm* — Timothy S. Stevens; Karen L. Kimble

(57) ABSTRACT

A kit of parts for making a turkey hunting decoy, the parts including right body portion, a left body portion and a fastener so that the skin portion of a turkey tail feather fan can be clamped between the right body portion and the left body portion by the fastener.

1 Claim, 4 Drawing Sheets

TURKEY FAN DECOY

BACKGROUND OF THE INVENTION

The instant invention relates to hunting decoys and more specifically to a kit of parts for making a turkey hunting decoy. As discussed in U.S. Pat. No. 7,231,737, turkey decoys have been produced in many forms and fall primarily under two categories: static decoys and motion decoys. The primary intent of both types of decoys is to attract a live turkey for observation or hunting purposes. Stationary or static decoys represent the general shape, size, color and feather pattern of a live turkey. These decoys are placed in an open area and used to attract a wild turkey, which may be passing by. These decoys are very basic and rely on the ability of a passing turkey to recognize the shape as a fellow turkey. Motion decoys are designed imitate the movements of a live turkey. The movements of the decoy are used to catch the attention of a passing turkey. The motions of the decoys are usually an attempt to mimic either one or more motions of a live turkey. The movement of these decoys is sometimes as simple as placing a static decoy on a pivot point which allows the wind to move the decoy side to side, or rock back and forth. The wind induced motion decoy is one of the simplest and most popular. U.S. Pat. No. 6,092,322 shows an example of wind-induced movements of a turkey decoy.

The motion of some decoys can be initiated by an operator with a manual pull string, push rod or electrical motor. The manual activation capability gives the operator the advantage of triggering the decoy's movement at an opportune time rather than relying on the randomness of the wind. Some motion decoys use a mechanical device that produces random movement of the decoy. Such a device is disclosed in U.S. Pat. No. 6,070,356. The use of random movement does not consistently give a level of certainty needed to attract a live turkey. The movement may occur when the live turkey is out of sight or they may occur too often when a turkey is close and frighten the turkey away.

During the mating season the wild male turkey will display its tail feathers by spreading them into a semi-circular fan shape as part of the mating strut. The tail feathers begin in a prone or close to horizontal position behind the bird and then rise vertically while simultaneously spreading into a fan shape. This action is done to demonstrate the dominance of the male turkey and thus convince a female to mate with him. The female turkey is attracted to the sight of the male turkey's fantail. Because of their competitive nature it has also been observed that male turkeys will also be attracted to the fan tail display. The males will compete for a hen by trying to out strut their fellow turkeys and/or by sparing. The sight of a strutting male will excite and irritate a fellow male turkey. The male turkey then will engage the competitor and attempt to drive them off or try to out strut them. If a male turkey has already gathered a group of females it is very difficult to draw him away from their company. The sight of a competing male turkey that may steal his mates is one of the few things that will pull him away from his group of females.

The tail feather fan of a male turkey is beautiful and many turkey hunters make a trophy of the fan for mounting on a wall. It would be an advance in the art of turkey hunting decoys if a kit of parts were discovered that would allow a turkey hunter to make his own realistic and effective decoy using a turkey tail fan already in the hunter's possession.

SUMMARY OF THE INVENTION

The instant invention is the discovery of a kit of parts that allows a turkey hunter to make his own realistic and effective decoy using a turkey tail fan already in the hunter's possession. The kit of parts comprises a right body portion, a left body portion and a fastener so that the skin portion of a turkey tail feather fan can be clamped between the right body portion and the left body portion by the fastener. Preferably, a passageway is provided into the clamped bodies so that the assembled decoy can be placed on a rod and pivot in a wind on the rod. In an alternative embodiment, a display mount is made from the kit of parts of the instant invention, a turkey tail feather fan and a turkey beard by clamping the skin portion of the turkey tail feather fan between the right body portion and the left body portion by the fastener, the turkey beard positioned in and extending from the passageway into the clamped bodies.

DETAILED DESCRIPTION OF THE INVENTION

Figure 1:
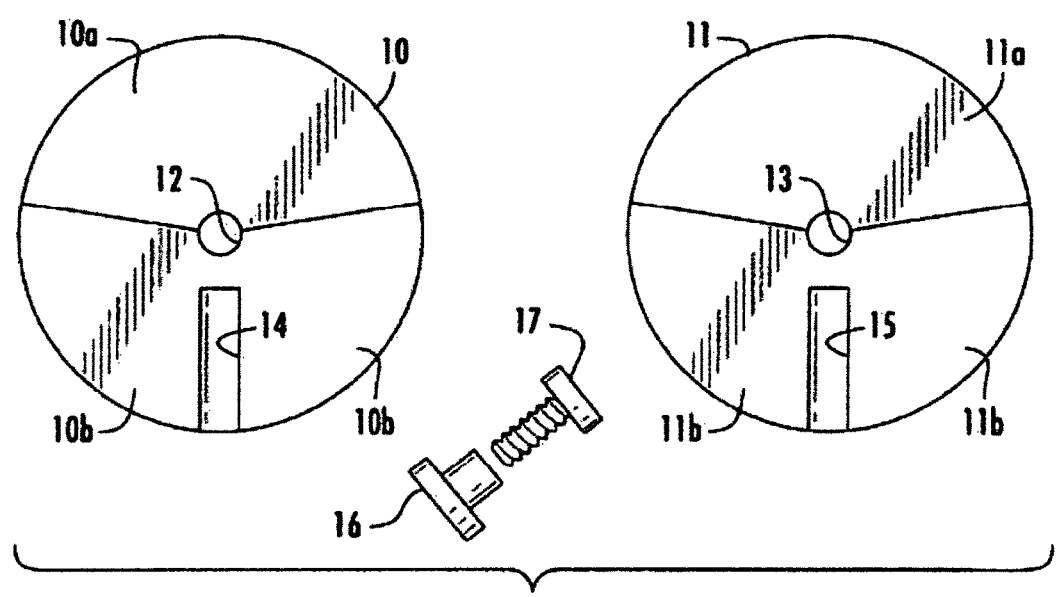
FIG. 1 is a view in full of a preferred kit of parts of the instant invention, the parts comprising a right and left body portion, a bolt and a shoulder nut.
Figure 2:
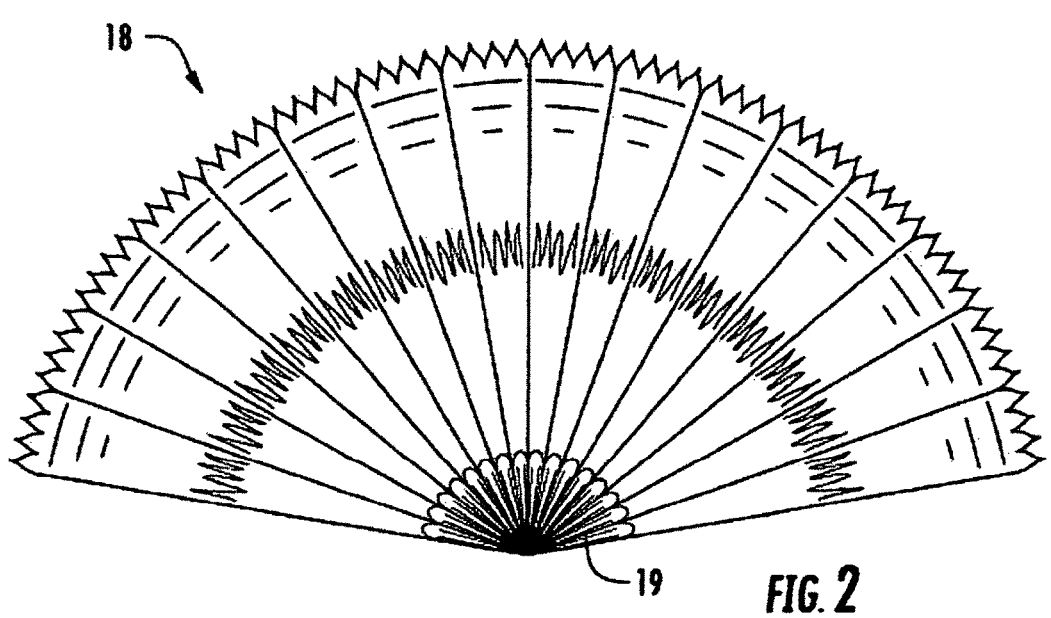
FIG. 2 is a view in full of a turkey tail feather fan.

Referring now to FIG. 1, therein is shown a view in full of a preferred kit of parts of the instant invention, the parts comprising a right body portion 11, a left body portion 10, a bolt 17 and a shoulder nut 16. The body portions 10 and 11 comprise apertures 12 and 13 as well as troughs 14 and 15. The back face of each disk 10 and 11 is flat. The front face of each disk 10 and 11 is stepped so that a pie shaped portion 10a and 11a of each disk is thinner than the remaining portion 10b and 11b of each disk. Referring now to FIG. 2, therein is shown is a view in full of a turkey tail feather fan 18. The quills of the feathers of the turkey tail feather fan 18 are held by the skin portion 19 of the fan 18.

Figure 3:
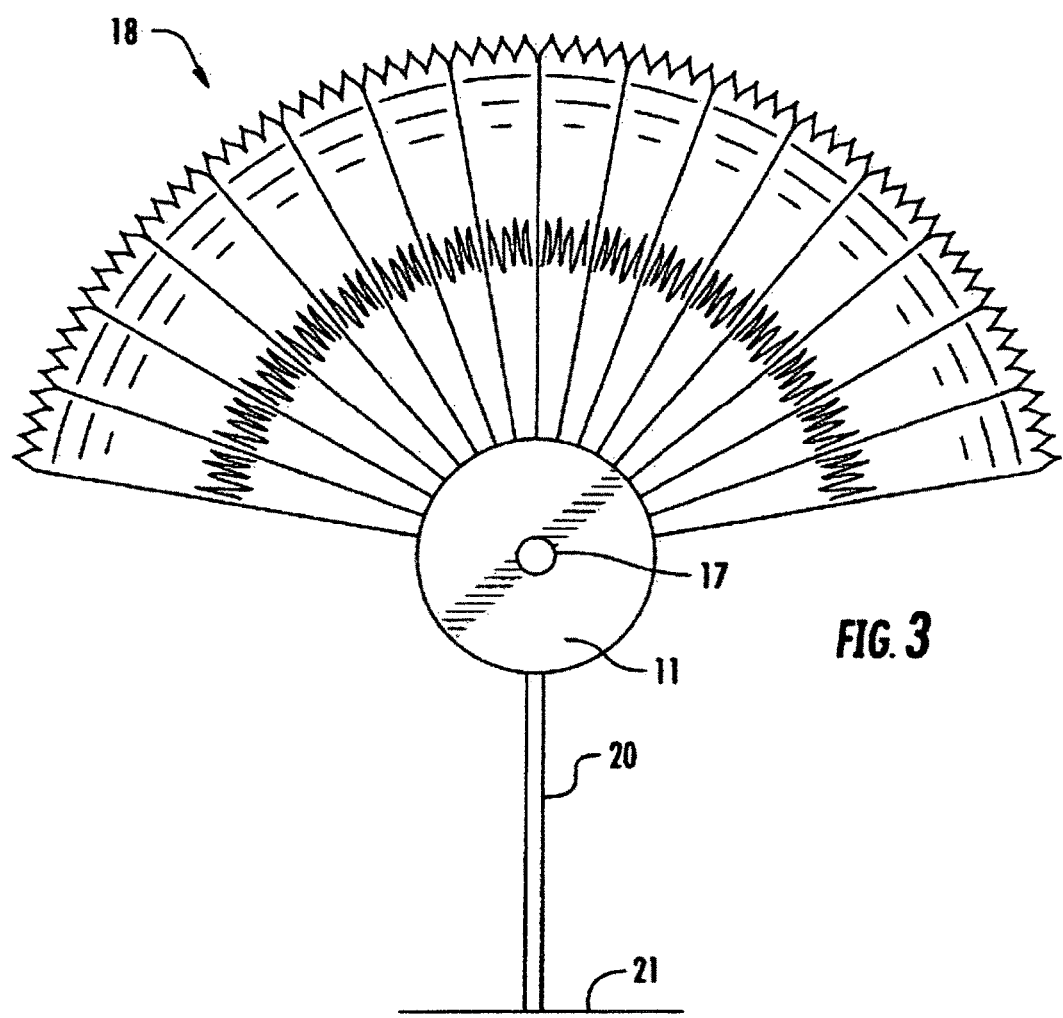
FIG. 3 is a view in full of a decoy assembled from the kit of the instant invention and a turkey tail feather fan, the assembled decoy shown positioned on a rod.
Figure 4:
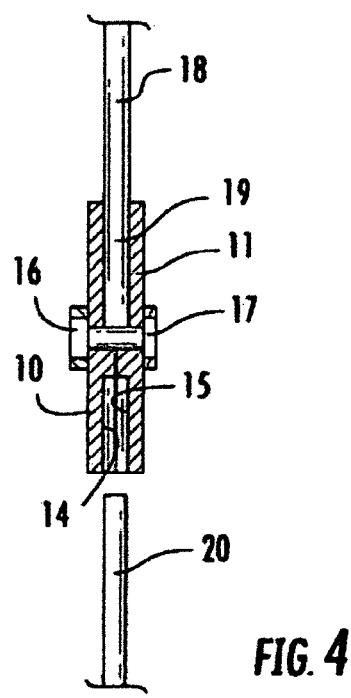
FIG. 4 is a cross-sectional side view of a decoy assembled from the kit of the instant invention and a turkey tail feather fan, the assembled decoy positions above a rod.
Figure 5:
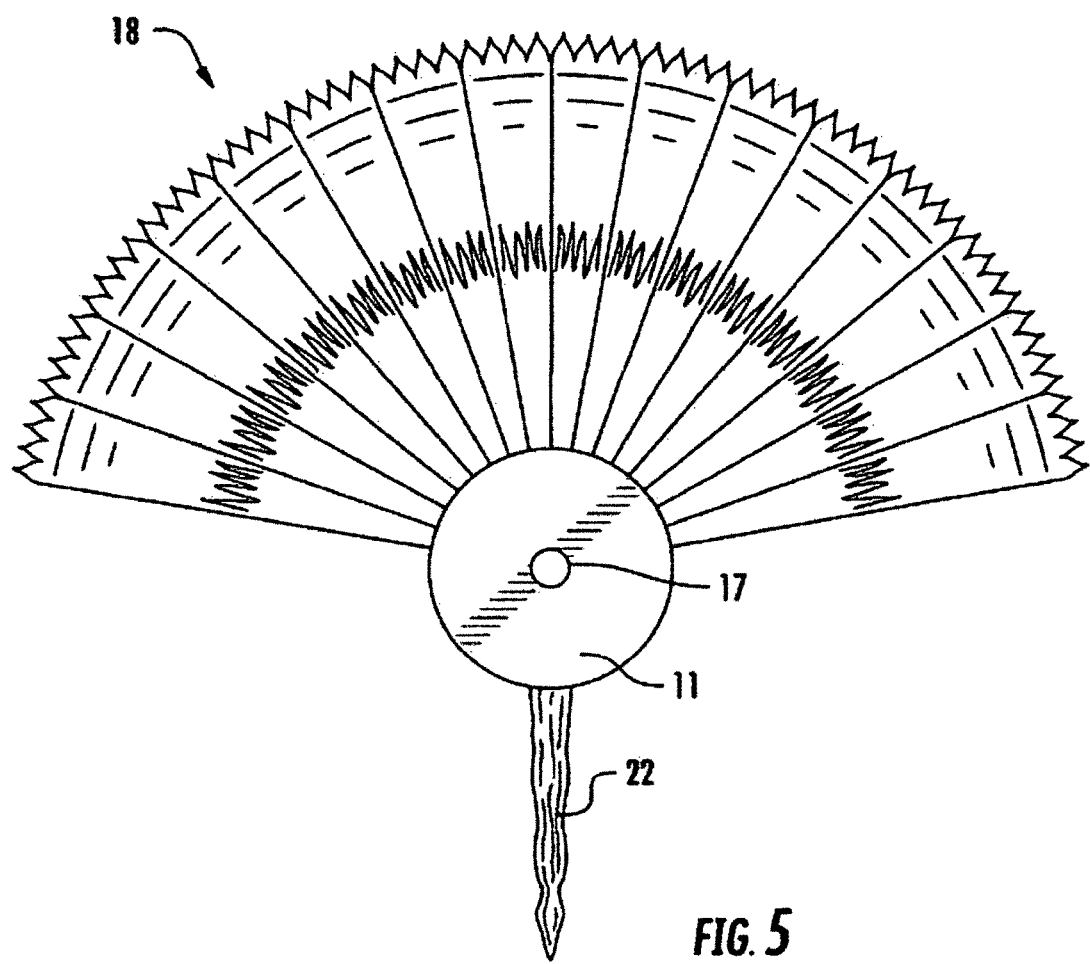
FIG. 5 is a view in full of the kit of the instant invention used to display a turkey tail feather fan and turkey beard.

Referring now to FIG. 4, therein is shown a cross-sectional side view of a decoy assembled from the kit of the instant invention. The assembled decoy comprises right body portion 11, left body portion 10, shoulder nut 16 and bolt 17. The skin portion 19 of the fan 18 is clamped between right body portion 11 and left body portion 10 with the clamping force provided by the nut 16 and bolt 17. Troughs 14 and 15 combine to form a passageway into the assembled decoy so that the assembled decoy can be placed on rod 20. Referring now to FIG. 3, therein is shown a full view of a decoy assembled from the kit of the instant invention and a turkey tail feather fan positioned on rod 20, which rod 20 has been driven into the ground 21. Referring now to FIG. 5, therein is shown an alternative embodiment of the instant invention in the form of a mount for displaying a turkey feather fan 18 and a turkey beard 22. Beard 22 is inserted into and extends from the passageway formed by troughs 14 and 15 shown in FIG. 4. A wall hanging bracket (not shown) can be attached on the back of the assembled mount so that the assembled mount can be hung on a wall.

The body portions can be made of any suitable material but preferably the body portions are made of one half inch thick, five and three quarters of an inch to six inches in diameter polyethylene disks that are routed to have stepped faces as depicted in FIG. 1. The fastener used to clamp the body portions together is preferably the shoulder nut and bolt shown in FIG. 1 but any suitable fastener can be used such as an ordinary nut and bolt, a screw or a rivet. The bore formed by the troughs 14 and 15 preferably has a diameter larger than the rod 20 so that the feathers of the fan 18 flutter in a wind and so that the decoy can turn in a wind. Such behavior of the instant invention in a wind is very effective in attracting both male and female turnkeys. Preferably, the front body portion is brown in color while the rear body portion is tan in color.

CONCLUSION

While the instant invention has been described above according to its preferred embodiments, it can be modified within the spirit and scope of this disclosure. This application is therefore intended to cover any variations, uses, or adaptations of the instant invention using the general principles disclosed herein. Further, the instant application is intended to cover such departures from the present disclosure as come within the known or customary practice in the art to which this invention pertains.

What is claimed is:

1. A kit of parts for making a turkey tail fan decoy, the parts comprising: a disk shaped right body portion, a disk shaped left body portion and a fastener, each disk shaped body portion having an edge portion and a central aperture therethrough from one face of each disk shaped body portion to the other face of each disk shaped body portion, one face of each disk shaped body portion being flat while the other face of each disk shaped body portion is stepped so that a pie shaped portion of each disk shaped body portion is thinner than the remaining portion of each disk shaped body portion so that a turkey tail feather fan having a skin portion can be clamped between the right body portion and the left disk shaped body portion by the fastener passing through the central aperture of each body portion with the pie shaped portion of each body portion adjacent the skin portion of the turkey tail feather fan to make a turkey tail fan decoy, further comprising a trough into each said remaining portion of each disk shaped body portion extending from the edge of each disk shaped body portion towards the center of each disk shaped body portion so that when the right disk shaped body portion is fastened to the left disk shaped body portion by the fastener to produce an assembly of the right disk shaped body portion, the left disk shaped body portion and the fastener with the trough of the right disk shaped body portion facing the trough of the left disk shaped body portion, a passageway is thereby produced into the assembly, the passageway into the assembly having an inside diameter so that the assembly can be mounted on a rod having an outside diameter smaller than the inside diameter of the passageway.

* * * * *